United States Patent [19]

North

[11] 3,955,490
[45] May 11, 1976

[54] INJECTION SYSTEM FOR MEAT PRODUCTS

[76] Inventor: Donald Richard North, Starling House, Lodge Lane, Salfords, Surrey, England

[22] Filed: Oct. 15, 1974

[21] Appl. No.: 514,803

[52] U.S. Cl. ............................... 99/532; 99/516
[51] Int. Cl.² ........................................ B02B 3/12
[58] Field of Search .................. 99/532, 494; 27/24; 117/89; 128/216, 220

[56] References Cited
UNITED STATES PATENTS

| | | | |
|---|---|---|---|
| 3,035,508 | 5/1962 | Nelson | 99/532 |
| 3,511,164 | 5/1970 | Strandine et al. | 99/532 |
| 3,636,857 | 1/1972 | Panek | 99/532 |
| 3,734,001 | 5/1973 | Poster | 99/532 |

FOREIGN PATENTS OR APPLICATIONS

| | | | |
|---|---|---|---|
| 2,066,763 | 7/1971 | France | 99/532 |

Primary Examiner—Stanley N. Gilreath
Assistant Examiner—Donald B. Massenberg
Attorney, Agent, or Firm—Mason, Fenwick & Lawrence

[57] ABSTRACT

An injection system for injecting a liquid material into a meat product comprises a double acting pneumatic drive cylinder, an injection cylinder the piston of which is connected to the piston of the drive cylinder and at least one injection needle connected to an outlet valve from the injection cylinder. A first stop member is fixed relative to the drive piston and a second stop member is fixed relative to the cylinder and there is an air supply control means that is actuated when the first stop member meets the second stop member to reverse the air supply to the drive cylinder.

5 Claims, 2 Drawing Figures

INJECTION SYSTEM FOR MEAT PRODUCTS

BACKGROUND OF THE INVENTION

The present invention relates to an injection system for introducing liquid material into a meat product and more particularly to a system for injecting flavouring materials into meat fowls.

It has previously been proposed to inject material into a meat product through one or more needles through which material is supplied on the basis of a timed cycle. It has also been proposed to drive an injection pump by a double-acting pneumatic cylinder the stroke of which is controlled by a separate pilot valve. In both these systems it is difficult to obtain the injection of a precisely predetermined quantity.

Government regulations, however, set down precise limits on the amount of material that may be added to meat products and it is, therefore, essential to have precise control over the volume of material supplied.

It is an object of the invention to provide an injection system that will supply an accurately controlled and repeatable volume of a liquid material to a meat product. It is also an object of the invention to provide a system that is of relatively simple construction and which can be operated in a simple manner.

SUMMARY OF THE INVENTION

The invention provides an injection system for introducing a liquid material into a meat product and comprising an injection cylinder having a piston slidable therein, an inlet valve permitting introduction of a liquid material to the injection cylinder during an induction stroke of the said piston and an outlet valve permitting discharge of the liquid material from the cylinder during a discharge stroke of the said piston, an injection needle, means connecting the outlet valve and the injection needle, a drive cylinder including a drive piston coupled to the injection piston for operating the injection piston, means for supplying air to the drive cylinder and means for controlling the stroke of the drive piston including a first stop member fixed relative to the drive piston, a second stop member fixed relative to the cylinder and control means provided in the second stop member for reversing the air supply to the drive cylinder when the first stop member meets the second stop member. Since the stroke of the drive cylinder is controlled directly by one stop meeting another stop the disadvantageous effects of pneumatic breaking, which can allow some overrun of the piston, are eliminated. The relative positions of the stops may be adjustable to permit adjustment of the stroke for varying the volume of liquid material supplied. Preferably, there is a handle for the injection needles on which there is a further, manually operable, occlusion orifice for initiating a drive stroke. Thus the cylinders may be remote from the injection needles and can be operated by a person while inserting the needles into the meat product.

DESCRIPTION OF THE PREFERRED EMBODIMENT

Figures 1, 2:
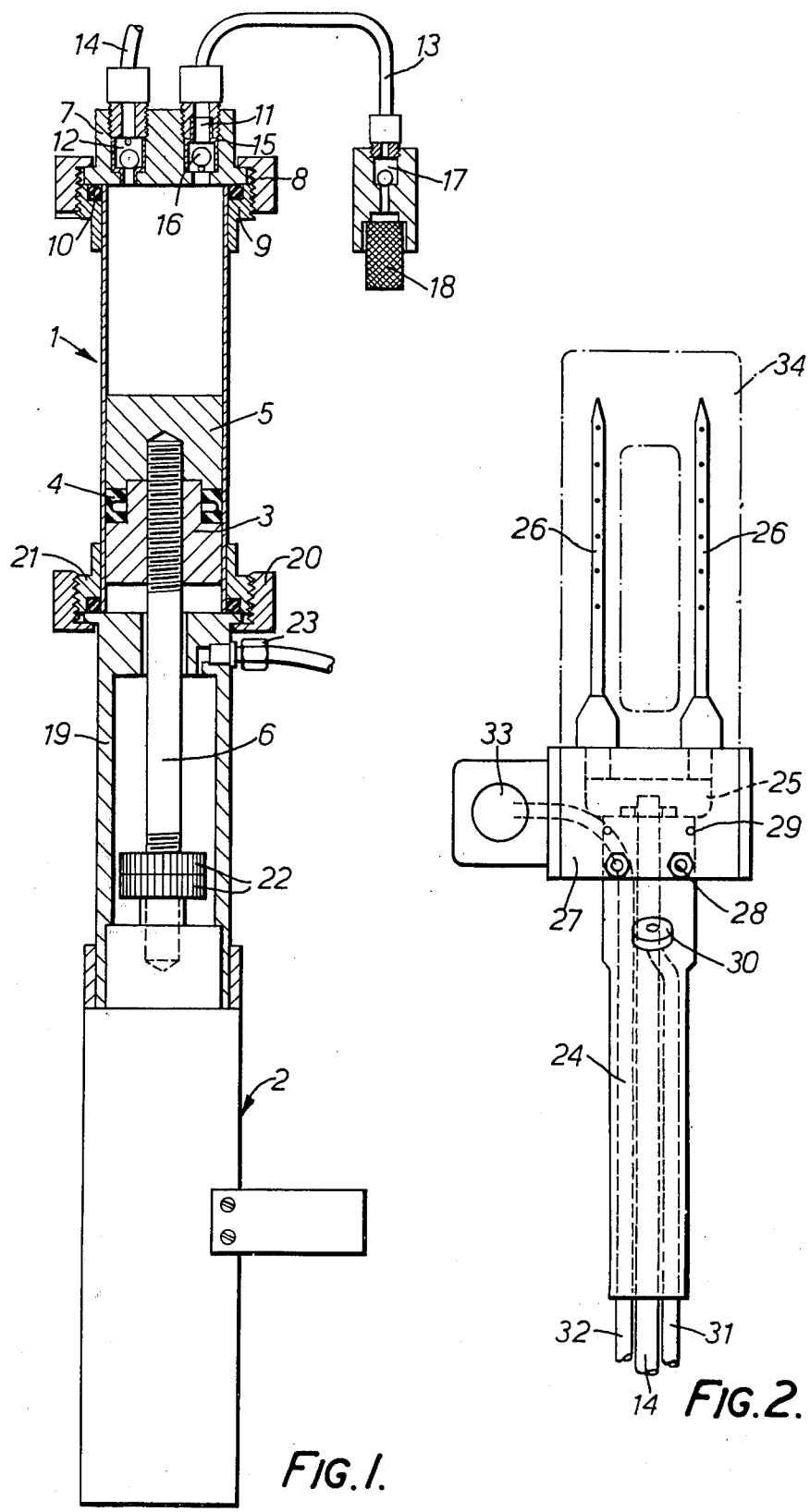
FIG. 1 is a plan view partially in section of a pump system.
FIG. 2 is a plan view of a hand gun for use with the pump of FIG. 1.

Referring to FIG. 1 the pump system comprises an injection cylinder generally indicated by the reference numeral 1 and a drive cylinder generally indicated by the reference numeral 2.

Within the injection cylinder 1 is a piston 3 which has a seal 4 and an extension piston 5. The piston 3 is mounted on a piston rod 6 which is connected to the piston of the drive cylinder 2.

One end of the injection cylinder 1 is closed by a valve body 7 which is held in place by a quick release nut 8 engaging with a male portion 9 on the cylinder 1. To ensure sealing between the valve body 7 and the cylinder 1 an 'O' ring seal 10 is provided in the male portion 9. The valve body 7 includes an inlet valve 11 and a discharge valve 12 which communicate respectively with an inlet pipe 13 and a discharge pipe 14. Each of the valves 11 and 12 comprises a valve insert 15 and a ball 16, the valve insert being squared so that the ball makes line contact with it.

The inlet pipe 13 is connected to a suction valve 17 and a filter 18. The valve and filter assembly 17 and 18 is placed in a reservoir (not shown) of flavouring material to be injected into the meat product. The discharge pipe 14 is connected to the hand gun shown in FIG. 2.

The end of the injection cylinder 1 is connected to a spacer member 19 by means of a quick release nut 20 engaging with a further male portion 21, on the cylinder 1. The opposite end of the spacer member 19 is connected to the drive cylinder 2. The piston rod 6 is connected to the piston of the drive cylinder 2 and in the region of the spacer member 19 is provided with two adjustable collars 22 for limiting the stroke of the injection piston 3. At the end of the spacer member 19 which is connected to the injection cylinder 1 there is provided an occlusion orifice 23, connected to air control means for controlling the operation of the drive cylinder 2. The face of the collar 22 and the face of the spacer member 19 in which the occlusion orifice 23 is formed are accurately machined so that orifice 23 is occluded, and the drive stroke of piston in the cylinder 2 is terminated at the precise moment that the collar 22 meets the face of the spacer member 19.

Referring now to FIG. 2 of the accompanying drawings, the discharge pipe 14 from the pump system is connected through a handle 24 to a distribution chamber 25 of the hand gun assembly. Communicating with the distribution chamber 25 are two injector needles 26. The distribution chamber 25 is formed by a cavity in a body member 27 into which the handle 24 is inserted. The handle 24 is held in place in the body member 27 by two screws 28 and is sealed in place by an O ring seal 29. The handle 24 can thus be released merely by removing the screws 28 and sliding it out from the chamber 25 to permit cleaning and maintainance.

Also mounted in the handle 24 is a further occlusion orifice 30 which is connected by an air line 31 passing through the handle 24 to the air control means. A third pipe 32, passes through the handle 24 from the air circuit to a pneumatic indicator 33 to indicate when the system is ready for use. Mounted on the body 27 is a guard 34 to protect the operator from the injector needles 26 and to act as a guide to control the depth of penetration of the needles into the meat product.

A plurality of pump systems may be provided in a bank at a single point and a hand gun connected to each pump may be arranged at a different injection station.

As will be well understood by anyone skilled in pneumatic control technology the control means operates by moving logic and has an input connected to a mains air supply, an output connected to each side of the drive cylinder 2 and two bleed outputs one connected to each of the occlusion orifices 23 and 30.

The method of operation of the device described above is as follows: When the pump system is ready for operation an indication to this effect is given by the pneumatic indicator 33. The operator then inserts the needles 26 into the meat product and closes the occlusion orifice 30 briefly by using a thumb to cover it. After the occlusion orifice 30 has been closed air is supplied to one side of the piston in the drive cylinder 2 driving the pushrod 6 and the piston 3 forward. The pressure of the material in the injection cylinder 1 closes the inlet valve 11 and opens the discharge valve 12 so that material is expelled through the discharge pipe 14 and the needles 26 into the meat product. After a stroke, the length of which can be determined precisely by adjusting the position of the collar 22 on the push rod 6, the collar strikes the end face of the spacer member 19 and so terminates the discharge of the material.

At the same time the collar 22 closes the occlusion orifice 23 which causes the air circuit to supply air to the opposite face of the piston in the drive cylinder 2 so withdrawing the piston 3. As the piston 3 is withdrawn the pressure within the cylinder 1 is reduced below atmospheric pressure so that the discharge valve 12 is closed and the inlet valve 11 is opened. The suction valve 17 is also opened so that material is drawn from the reservoir through the inlet pipe 13 into the injection cylinder 1. The induction stroke of the piston 3 is terminated when the piston in the drive cylinder 2 reaches its fully retracted position and the pneumatic indicator 33 indicates that the system is again ready for an injection operation.

Although only one embodiment of an injection system has been described and illustrated herein, it will be readily understood by one skilled in the art that modifications and variations may be made within the scope of the invention.

What is claimed is:

1. An injection system for introducing a liquid material into a meat product and comprising an injection cylinder having a piston slidable therein, an inlet valve permitting introduction of a liquid material to the injection cylinder during an induction stroke of the said piston and an outlet valve permitting discharge of the liquid material from the cylinder during a discharge stroke of said piston, an injection needle, means connecting the outlet valve and the injection needle, a drive cylinder including a drive piston coupled to the injection piston for operating the injection piston, means for supplying air to the drive cylinder, and means for controlling the stroke of the drive piston including a first stop member adjusted to a predetermined fixed position relative to the drive piston for coordinated movements therewith, a second stop member fixed relative to the drive cylinder, said second stop member having an occlusion orifice positioned to be engaged and closed by a confronting surface portion of the first stop member when the drive piston reaches a predetermined stroke position, and an air control circuit connected to the occlusion orifice, the air control circuit being arranged to cease application of the force moving the drive piston and first stop member toward the second stop member upon closure of the occlusion orifice by the first stop member.

2. An injection system according to claim 1, wherein the air control circuit includes means causing the air supply to the drive cylinder to be reversed when the occlusion orifice is closed by the first stop member.

3. An injection system according to claim 1, including means defining a further manually operable occlusion orifice which when operated causes air to be supplied to the drive cylinder to initiate a drive stroke.

4. An injection system according to claim 3, including a handle supporting the injection needle, the further occlusion orifice being mounted on the handle.

5. An injection system according to claim 1, wherein the air supply means is connected to pneumatic indicator means for indicating when the air supply means is ready for an injection operation.

* * * * *